June 6, 1967 D. L. HINGS 3,324,385
METHOD AND APPARATUS INCLUDING MOVABLE ARMATURE MEANS
AND TRANSIENT ELECTROMAGNETIC WAVE DETECTING
MEANS FOR LOCATING ANOMALOUS BODIES
Filed Nov. 27, 1961 4 Sheets-Sheet 1

INVENTOR.
DONALD L. HINGS
BY Woodling, Krost,
Granger and Rust,
ATTORNEYS

June 6, 1967 D. L. HINGS 3,324,385
METHOD AND APPARATUS INCLUDING MOVABLE ARMATURE MEANS
AND TRANSIENT ELECTROMAGNETIC WAVE DETECTING
MEANS FOR LOCATING ANOMALOUS BODIES
Filed Nov. 27, 1961 4 Sheets-Sheet 4

INVENTOR.
DONALD L. HINGS
BY Woodling, Krost,
Granger and Rust,
ATTORNEYS

United States Patent Office 3,324,385
Patented June 6, 1967

3,324,385
METHOD AND APPARATUS INCLUDING MOVABLE ARMATURE MEANS AND TRANSIENT ELECTROMAGNETIC WAVE DETECTING MEANS FOR LOCATING ANOMALOUS BODIES
Donald L. Hings, 281 N. Howard Ave., Vancouver, British Columbia, Canada
Filed Nov. 27, 1961, Ser. No. 154,981
Claims priority, application Canada, Nov. 13, 1961, 835,856
18 Claims. (Cl. 324—8)

The invention relates in general to an anomaly detector system of electromagnetic wave energy and, more particularly, to a system which may be passive or relatively stationary as far as the detector location is concerned and which may be used to detect the presence and the location of anomalies, either magnetic or electrical.

The invention relates generally to a detector for an anomaly which is either magnetic or electrical or a combination of both and utilizes a movable metallic vehicle or armature and a detector for one of magnetic and telluric current fields, with means to move the vehicle relative to the detector means and upon movement of the vehicle past any anomaly, such movement produces a change in the magnetic or telluric current field which is detectable or measurable at the detector means.

This application is a continuation in part of my copending application Ser. No. 857,336, filed Dec. 4, 1959, now Patent No. 3,188,560, entitled, "Survey Apparatus and Method for Determining and Recording Minute Deviations in the Earth's Total Magnetic Field," and my co-pending application, Ser. No. 124,628, filed July 17, 1961, now abandoned, entitled, "Electrical Pickup," and the subject matter of said applications is fully incorporated in this application the same as though it were included herein.

The invention relates to method and apparatus for determining the location of a magnetically or electrically polarized mass. It may be considered a geophysical means and relates to the geomagnetic and geotelluric fields of the earth wherein a magnetic or telluric detection apparatus may determine the presence or location of a magnetic or telluric anomalous mass, whether in a stationary or movable form.

Accordingly, it is an object of the invention to detect alternating changes in the magnetic or telluric fields of the earth, created by the motion of a secondary member such as a metallic vehicle moving relative to the detection apparatus and the anomaly being detected.

Another object of the invention is to operate a moving vehicle such as a vehicle capable of being polarized either magnetically or electrically to thereby influence the detection apparatus by the change in the electromagnetic fields caused by motion of the moving vehicle near an anomalous body.

Another object of the invention is to determine the location of an anomalous body having relatively static characteristics in the magnetic and telluric fields, by converting the static characteristics to dynamic characteristics by the influence of a magnetically or electrically susceptible moving body or vehicle between the detection instrument and the said anomalous static body or near the anomalous body.

More specifically, it is a purpose of this invention to measure and determine the existence of an anomalous body in either the telluric or magnetic fields of the earth over distances greater than could normally be measured directly from the anomalous body, by producing electromagnetic variations through the agency of the influence of a moving susceptible body through these fields. It has been found that a large mass which creates an anomaly in either the electrical or magnetic fields of the earth, may be identified or detected by the influence of a relatively smaller moving susceptible or polarized body, which passes the larger mass to thereby create a transient electromagnetic wave or a change in the field surrounding the anomalous body which change or transient is detectable with suitable apparatus at a location remote from both the said anomalous mass or body and the intervening moving body.

It is a purpose of this invention to make geophysical measurements wherein the detection equipment may be located at a first location with a means of control to a moving body or vehicle to thereby sweep or scan an area over the surface of the earth wherein the moving body constitutes a suitable vehicle having susceptible or polarizing characteristics in the telluric or magnetic fields to thereby create electromagnetic waves from larger susceptible objects or anomalies.

Other objects and a fuller understanding of the invention may be had by referring to the following description and claims, taken in conjunction with the accompanying drawings, in which:

Figure 1:
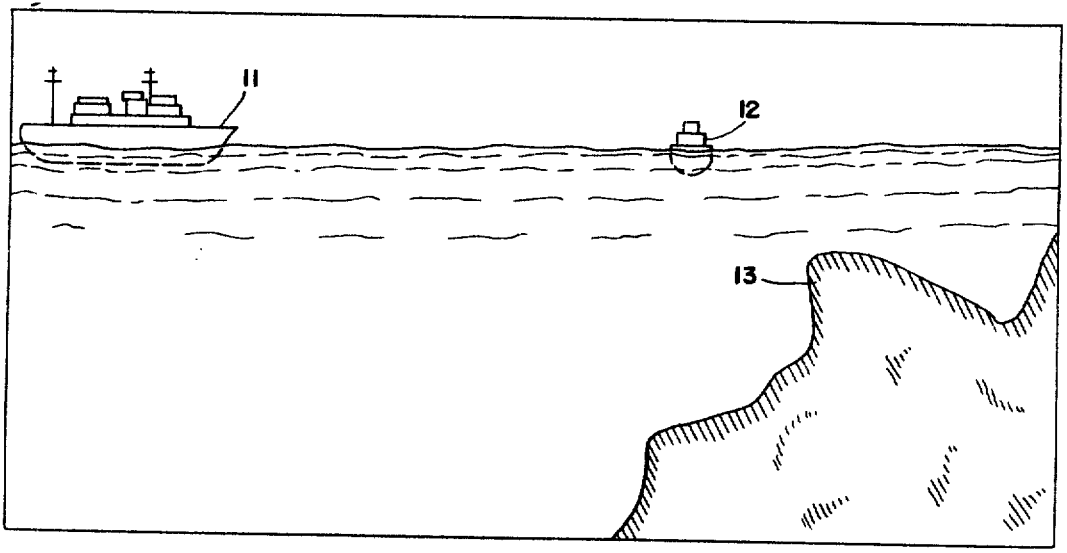
FIGURE 1 is an elevational view of a passive detector system according to the invention.

FIGURE 1 illustrates a water borne vessel 11 which may carry suitable detection apparatus 14 (see FIG. 3) to detect electromagnetic waves. A moving vehicle 12 is shown as being another vessel movable on the surface of the water. An anomaly 13 is an underwater projection and is one form of an anomalous mass or body which is an anomaly in one of magnetic and electrical fields. The electrical field may be that established by the telluric currents of the earth.

Figure 2:
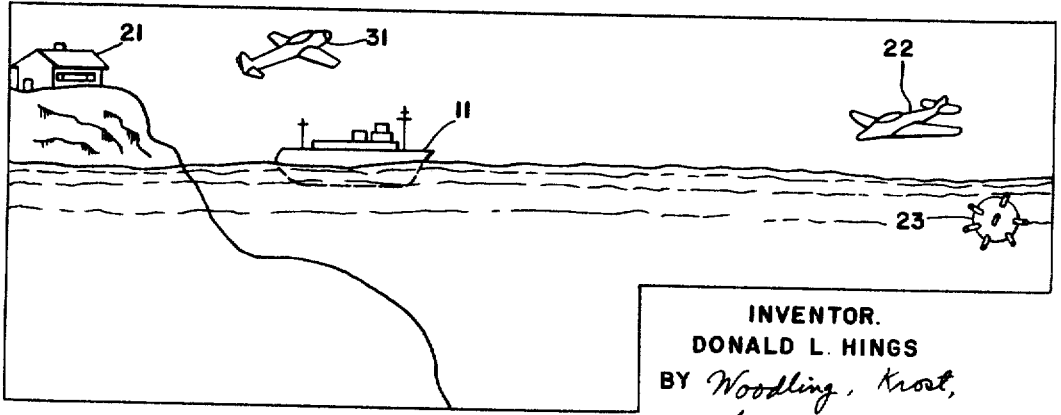
FIGURE 2 is a modification of the system of FIGURE 1.

FIGURE 2 shows another form of the detection system of the invention and includes detection apparatus 14 (see FIG. 3) at a first location such as in a structure 21 stationary on land. The first location may also be a vessel 11 or an aircraft 31. The moving vehicle in this FIGURE 2 is shown as being another aircraft 22. The anomaly is shown as being an underwater mine 23 or it may be some other underwater vessel.

Figure 3:
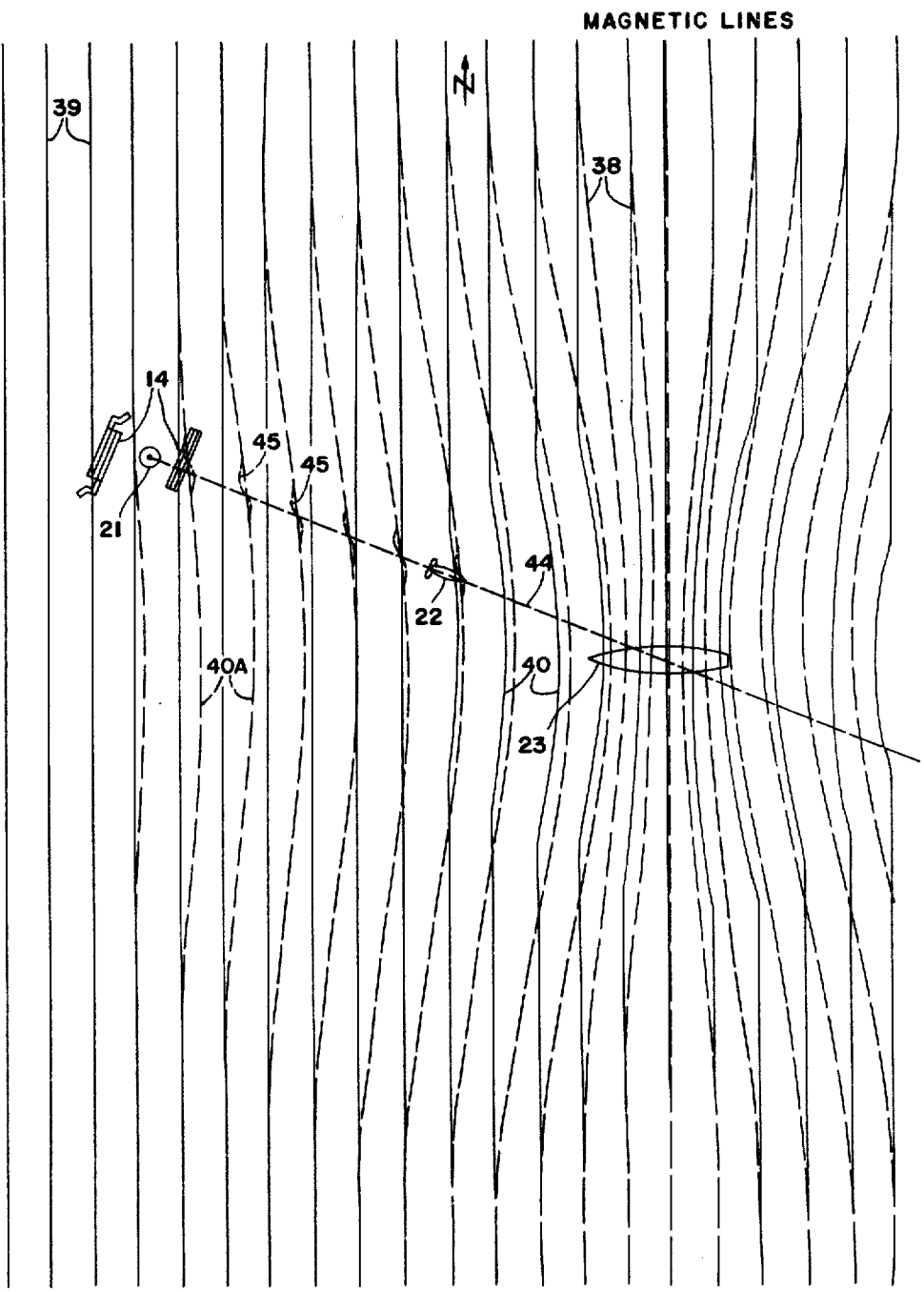
FIGURE 3 is a plan view of the system of FIGURE 2 showing a magnetic detection system.
Figure 4:
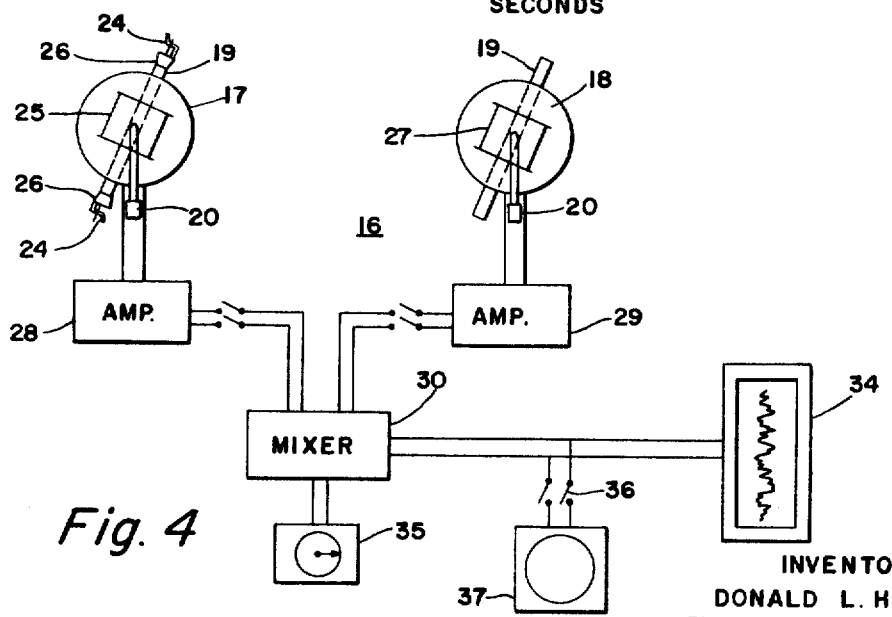
FIGURE 4 is a schematic diagram of a magnetic detection mechanism suitable for use with this invention.

FIGURE 3 shows in plan view the system of FIGURE 2 or FIGURE 1. In FIGURE 3, the first location is indicated by the position of the structure 21 at which is located the detection apparatus 14. This detection apparatus is illustrated as being a magnetic detector to detect changes in the magnetic field, either the intensity or the direction thereof. FIGURE 4 illustrates a magnetic detector mechanism 16 which is one form of detection apparatus 14. This magnetic detector mechanism 16 includes any of the various apparatuses described in my co-pending application Ser. No. 857,336, now Patent No. 3,188,560. The apparatus shown in FIGURE 4 includes a search or sweep compass 17 and a non-search or non-sweep compass 18. Each compass 17 and 18 has a magnetic core 19 which is mounted on a movable mount such as gimbal rings and including verniers to position the axis of each compass 17 and 18 along the neutral axis of the earth's magnetic field. This might be at an angle of declination as assumed by a magnetic dip needle. Accordingly, the axes of the cores 19 will be established in a magnetic North-South plane. The two compasses 17 and 18 may be mounted on a fixed base with bubble levels for leveling purposes and may also be equipped with pendulums 20 which may be adjustably clamped to the cores 19 to maintain them on this magnetic neutral axis even though the bases of the compasses 17 and 18 may tilt. This may be the case if the detector mechanism 16 is mounted on the vessel 11, for example.

The search compass 17 has small revolvable armatures 24 on each end of the core 19. These armatures 24 are disposed with the outboard end at a small angle to the axis of the core 19 and are of opposite phase displacement. The two armatures 24 may be rotated in synchronism and, thus, they affect the effective magnetic axis of the core 19 to make it rotate about a double-ended reference cone. Upon such sweep or scanning through this reference cone, a sine wave of voltage is generated in a coil 25 surrounding the core 19. Magnetic fingers 26 are positioned on each end of the core 19 in the search compass 17 and these magnetic fingers are disposed in an eliptical path with this eliptical path effectively neutralizing the sine wave of voltage generated in the coil 25 by rotation of the armature 24. This rotation or scanning of the armature 24 may be at a relatively slow rate such as fifteen revolutions per minute.

The non-search compass 18 also has a coil 27 for development of any voltage therein as caused by changes in the magnetic field of the earth. The coil 25 is connected to an amplifier 28 and coil 27 is connected to an amplifier 29. The amplifiers 28 and 29 are connected in an out-of-phase connection to a mixer 30. Thus, the mixer receives voltages proportionate to the voltages appearing on the two coils 25 and 27 and since these two voltages are out-of-phase, they tend to cancel each other except for the differences determined by the searching or sweeping action of the armatures 24. With the axes of the cores 19 directly aligned with the magnetic neutral of the earth's magnetic field, the non-search compass 18 will not develop any voltage. Also, the sweep compass 17 will not develop any voltage due to the normal or nominal magnetic field but will develop a voltage proportional to any magnetic anomaly affecting the field at the first location of the vessel 11 or structure 21.

The magnetic field of the earth has a daily or diurnal change and the mean of this diurnal change is roughly a sine wave of 24 hours for one cycle. The voltages induced in the non-search unit 18 will be responsive to the earth's minutial diurnal fields as these changes affect the neutral magnetic axis. The voltages induced in the search compass 17 will be responsive to both the earth's minutial diurnal fields and to the deviations of the earth's total magnetic field. Accordingly, when the two voltages are mixed in opposition, the output voltage from the mixer 30, which may be fed to a recorder 34, will be responsive to the deviations of the earth's total magnetic field. A synchronous timer 35 may be connected to the mixer 30 to produce a blip voltage in the voltage wave being recorded by the recorder 76. The blips are synchronized with the speed of the scanning operation for one per cycle to, thus, produce a reference marker on the recorder as to the commencement of each cycle. The output from the mixer 30 may also be fed through a switch 36 to a plan position indicator 37. This may be similar to a radar scanning device presenting visual instantaneous indication of the output voltage.

Figure 5:
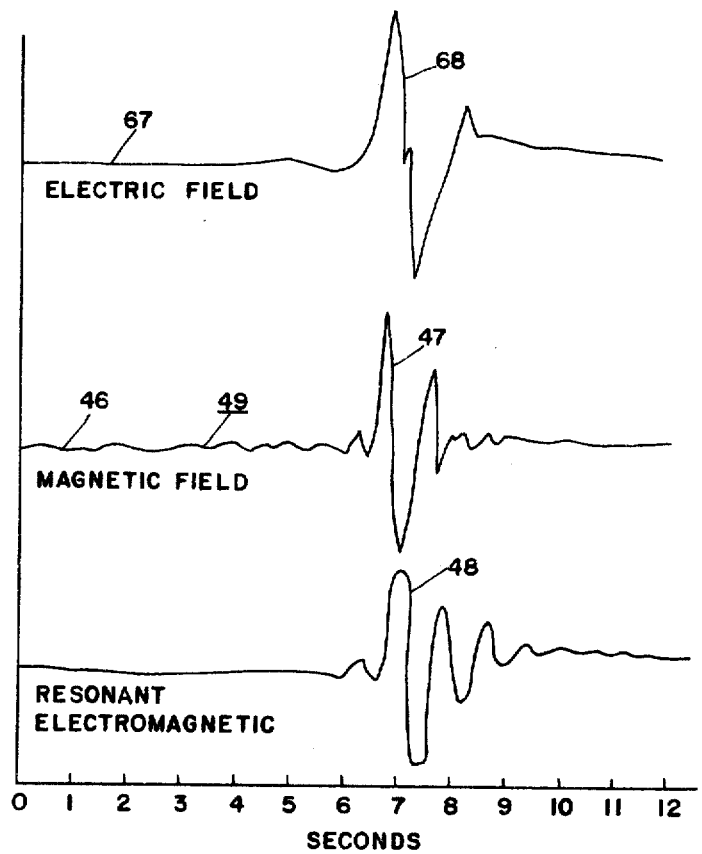
FIGURE 5 is a graph of voltage and magnetic waves.

FIGURE 3 shows the magnetic lines 38 of the earth. The anomaly 23 is a magnetic anomaly since it includes magnetically permeable material. Accordingly, these magnetic lines 38 includes some magnetic lines 39 which are shown as straight magnetic lines assuming that the earth's matter is perfectly homogeneous in this area remote from the anomaly 23 and normally the magnetic lines 38 do include some straight magnetic lines 39 which travel generally North and South. The presence of the anomaly 23 establishes some curved or disturbed magnetic lines 40 which converge toward the anomaly 23 and then diverge away from it. Accordingly, a greater magnetic field intensity is found at the anomaly 23. It has been found that a moving metallic vehicle such as the aircraft 22 or the movable vehicle 12, by its movement, will affect the field at the first location 11 or 21, which field has previously been disturbed by the presence of the anomaly 23. It is a theory of operation that movement of the vehicle 22, for example along a radial path 44 relative to the detection apparatus 14, will cause a transient response 45 in each of the magnetic lines 38. When the movable vehicle 22 is close to the detection apparatus 14, this disturbance 45 will be observable in the detection apparatus 14 as ripples 46 in FIGURE 5. These ripples may be considered to be background noise and will be observable on the recorder 34 or the plan position indicator 37. When the movable vehicle 22 gets a considerable distance away from the detection apparatus 14, for example a mile or two, then such movement is no longer discernible by the detection apparatus 14. However, when the movable vehicle 22 happens to pass in the neighborhood of any such anomaly 23, it has been found that an observable electromagnetic wave or transiently disturbed field 40A is created. A theory of operation is that the movable vehicle 22 passes through the greater intensity field at and near the anomaly 23 and it will be noted that the field intensity is more rarefied on either side of the anomaly 23. This passage of the vehicle 22 through the alternately rarefied and increased field intensity may be reasons for developing or creating an electromagnetic wave. The electromagnetic wave created may be observed as a change or transient 47 in the magnetic field 49 as seen in FIGURE 5. This transient magnetic field 40A is determined generally by the speed of the moving vehicle 22 and may be in the order of one cycle per second. The magnetic detection apparatus 16 may have a very high inductance, in the order of 2,000 henries, which will have a resonant period of several seconds per cycle and, accordingly, this transient electromagnetic wave is resonated by the magnetic detector mechanism 16 to produce a resonant electromagnetic wave 48 as seen in FIGURE 5. The long period of resonance of the mechanism 16 eliminates much of the ripple or background noise 46 seen in the magnetic field curve 49 of FIGURE 5.

Figure 6:
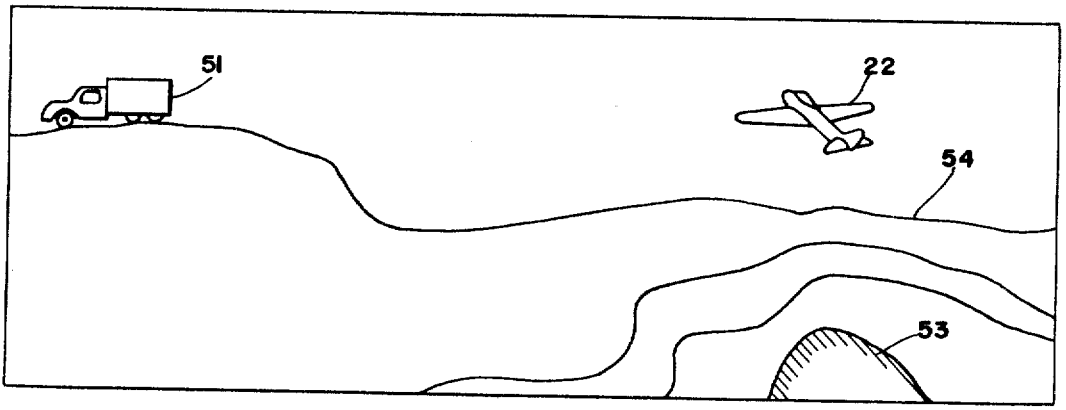
FIGURE 6 is an elevational view of another modification of the invention.

FIGURE 6 illustrates another modification of the system wherein the detection apparatus 14 (see FIG. 3) may be housed in a truck 51 at a first location. The moving vehicle may be a moving wheeled vehicle but is shown as being an aircraft 22 for geophysical exploration or search over terrain 54 which is too rough for easy surface exploration by either the truck 51 or some other wheeled movable vehicle. An anomaly 53 is shown as an underground mass which is either magnetic or electrically anomalous. This may be an underground deposit of ore or it may be an interface of oil and saltwater which generates a small voltage over a large area to create both a magnetic and an electrical anomaly.

Figure 7:
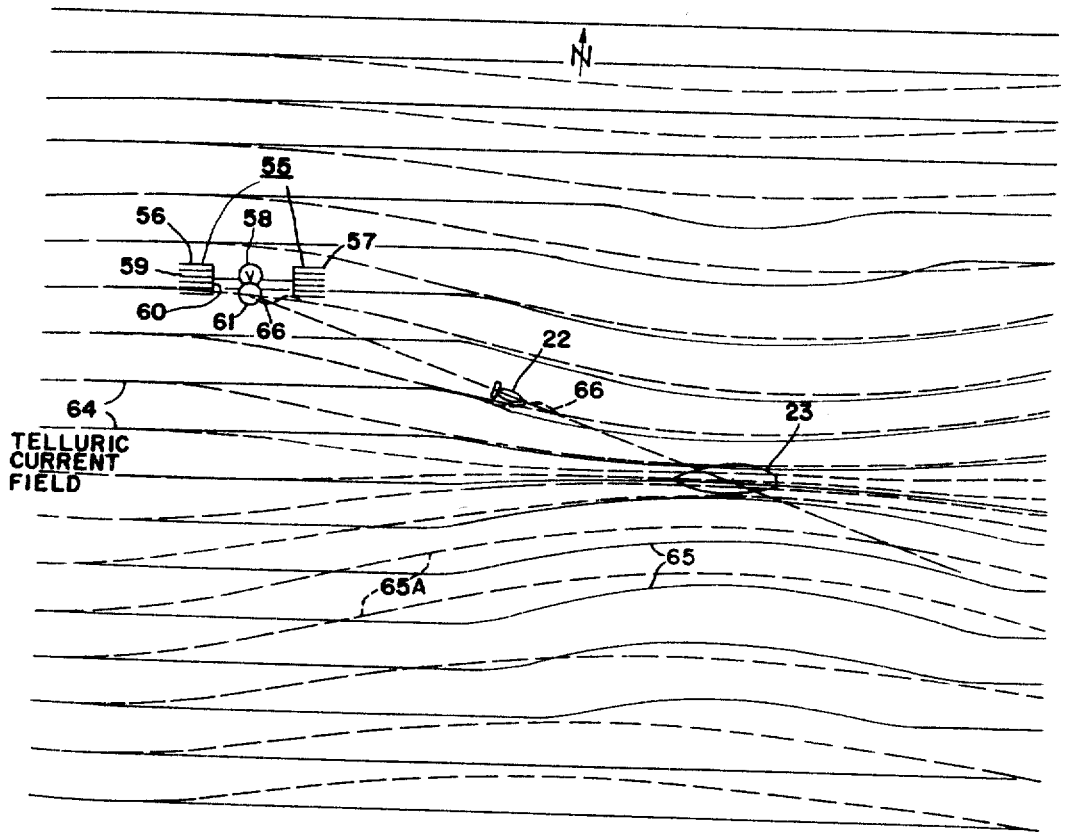
FIGURE 7 is a plan view of the system shown in FIGURE 2 and utilizing an electrical detection mechanism.

FIGURE 7 is similar to FIGURE 3 and illustrates in plan view any of the systems in FIGURES 1, 2 or 6. A first location 61 is shown and this may be any of the aforementioned first locations, such as the vessel 11, the structure 21, the aircraft 31 or the truck 51. Detection apparatus 14 is provided at this first location 61 and this is shown as being electrical detector mechanism 55. This detector mechanism may be any of the mechanisms described in my copending application, Ser. No. 124,628, field July 17, 1961, now abandoned, entitled "Electrical Pickup." This electrical detector mechanism includes generally first and second conductor means 56 and 57, respectively, and connected to a meter 58. It has been found that if a number of open ended conductors, which form the conductor means 56, are open ended on one end 59 and interconnected at the opposite end 60 and then the closed ends of two such conductor means 56 and 57 are connected to the voltmeter 58 with the conductor means 56 and 57 pointing in opposite directions and insulated from the surface of the earth but close to it, then they will receive a voltage thereon proportional to the telluric currents of the earth. The telluric currents run generally East and West, as shown in FIGURE 7 along the magnetic isodyne lines, and are affected by magnetic and/or electrical anomalies such as the anomaly 23. The telluric current field 64 is disturbed as shown by the curved field lines 65 by the presence of the anomaly 23. A moving vehicle 22 or 12 may move along the radial line from the first location 61. As it moves along, it is considered that it causes minor variations in the telluric current field as shown by the variations or transient disturbances 66. When the movement of the vehicle 22 is near the anomaly 23, then it has been found that the movement of this vehicle 22 co-acts with the disturbed field 65 caused by the anomaly 23 to produce an observable effect on the electrical detector mechanism 55. This effect is established by a transient wave or a transiently disturbed field 65A. This effect may be observable even though the distance is several miles. FIGURE 5 shows the electrical field curve 67, which has a transient electromagnetic wave 68, observable at the detector mechanism 55 when the movable vehicle 22 passes near the anomaly 23.

It will be noted that in FIGURE 1 the measurement of the sea bottom is made by the vessel 11 by the motion of the smaller craft or vessel 12 in the vicinity of the projection 13 from the sea bottom.

In FIGURE 2, the first location whereat the detector apparatus is located may be any one of the stationary structure 21 or the relatively stationary vessel 11 or may be carried in the aircraft 31. In this case, the moving vehicle is an aircraft and the anomaly could be some underwater device such as a mine or vessel.

FIGURE 6 shows the method of locating a subterranean mass or body which is anomalous and is located under terrain 54 which is too rough for travel. The first location may again be in a stationary structure or, as shown, may be in a movable truck 51 for geophysical exploration. The moving vehicle is shown as an aircraft 22 for easy traverse of the rugged terrain 54. Where several different aircraft may be used as different vehicles all operating from a common detector apparatus, then each aircraft may carry a different voltage pulsing device operated on a different frequency. This may be similar to the system used in World War II by the allies termed "identification friend or foe" (IFF) to identify different aircraft by a particular frequency of pips on the radar screen. Such pulsing by the various aircraft 22 would be merely for identification of the individual aircraft and to distinguish between it and other polarized bodies that also may be moving.

A theory of operation of the invention appears to be that the anamolous mass 13, 23 or 53 does create an anomalous change in both the telluric and magnetic fields. However, the telluric distortion can be measured at distances greater than the magnetic distortion. In other words, it appears that the carrier of the impulse waves created by the relative passage of the two objects is the telluric field and these telluric currents travel through the saltwater or through the conductive soil of the earth or along the surface of it. The impulse waves travelling in the telluric currents creates a change in the local magnetic field to be observable by magnetic detection apparatus as well as telluric detection apparatus. The mechanics of the creation of the impulse or transient wave appears to be as follows. The disturbance of the magnetic anomaly around the generally larger mass 13, 23 or 53 by the passage of the generally smaller vehicle 12 or 22 creates a magnetic polar fluctuation in the larger mass that in turn produces an electrical equivalent fluctuation along the conductive surface of the larger mass which distorts momentarily the already anomalous telluric currents. It is this fluctuation of the telluric currents by the electromagnetic action of the larger mass that creates the impulse that is carried by the telluric currents to the detection location 11, 21, 31 or 51.

The above systems describe the use of methods and apparatuses which utilize some form of a movable vehicle either on land, on the sea, or in the air which, by their movement, create a change in the field previously disturbed by the presence of an anomaly. Preferably, the movable vehicles would move in predetermined patterns such as along radial lines from the first locations. This would aid ready determination of anomalies by the gradual change in the ripple 46 of FIGURE 5. The movable vehicle 12 or 22 or a moving land vehicle, such as a wheeled vehicle, may be considered to be an armature or projectile polarized or susceptible to the magnetic or electrical fields of the earth. The movement of this vehicle, as it passes an anomaly, influences the relatively large static field of that anomaly to produce an electromagnetic wave and this created wave energy is measurable at the detection apparatus which is at a remote detection point. This remote point at the aforesaid first location may be stationary and, thus, this is a passive detection system rather than requiring movement of the detector apparatus.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An electromagnetic wave detector system comprising, in combination, a detector, a polarizable body, and means to move said polarizable body to passively create transient electromagnetic waves detectable at said detector upon the movement relative to said detector of said polarizable body near an anomalous body.

2. Detection apparatus of magnetic or telluric fields comprising, in combination, a detector, a vehicle movable remotely from said detector, and means for controlling the course of said vehicle to thereby determine by a detected passively generated signal on said detector the location of an anomalous mass when passed by said vehicle.

3. In combination, detector means for one of magnetic and telluric current fields, armature vehicle means remote from said detector means and having no electrical communication link thereto, said armature vehicle means being movable relative to said detector means, whereby passage of said vehicle means in the neighborhood of any body which is one of magnetically and electrically anomalous passively generates transient electromagnetic waves measurable at said detector means.

4. A detector for an anomalous body, comprising in combination, a roving armature vehicle, detector means for one of magnetic and telluric fields, means to move said vehicle substantially parallel to the surface of the earth and along a radius relative to said detector means, whereby movement of said roving armature vehicle near any body which is one of electrically and magnetically anomalous passively produces a measurable effect of change in said field at said detector means.

5. A detection system for operation on one of sea, land, and air, comprising, in combination, a detector, a vehicle in one of the said sea, land and air movable remotely from said detector, means to move said vehicle, the passage of said vehicle past a body which is one of magnetically and electrically susceptible establishing electromagnetic waves by the passive inter-action of said moving vehicle and said body to thereby have said electromagnetic waves determinable at said detector.

6. Detector means for a body which is one of magnetically and electrically anomalous comprising, in combination, a projectile, a resonant electromagnetic wave detector, means to project said projectile at a predetermined rate relative to said detector, and means to record the resonant electromagnetic waves passively derived from the passage of said projectile past a body which is one of magnetically and electrically anomalous to thereby determine the presence and location of said anomalous body.

7. Locating apparatus to locate an anomaly which is one of magnetically and electrically anomalous, comprising, in combination, a first determining location relative to the earth, a detector at said first location, said first location having a first field as determined by one of the earth's magnetic field and telluric currents, a metallic vehicle movable relative to said first location and acting as a movable metallic armature, any said anomaly at a location remote from said first determining location deflecting the earth's magnetic and electrical field in and around said anomaly, whereby passage of said movable metallic vehicle near any said anomaly disturbs said first field at said first location to produce a transient field determinable on said detector at said first location.

8. Locating apparatus to locate an anomaly which is one of magnetically and electrically anomalous, comprising, in combination, a first determining location relative to the earth, a detector at said first location, said first location having a first field as determined by one of the earth's magnetic field and telluric currents, a metallic vehicle movable along a radial line relative to said first location and acting as a movable metallic armature, any said anomaly at a location remote from said first determining location deflecting the earth's magnetic and electrical field in and around said anomaly, said first location being comparatively stationary relative to the earth compared to said movable vehicle and said magnetic anomaly being comparatively stationary relative to the earth compared to said movable vehicle, whereby passage of said movable metallic vehicle in a horizontal plane near any said anomaly disturbs said first field at said first location to produce a transient field determinable on said detector at said first location.

9. Locating apparatus to locate an electrical anomaly, comprising, in combination, a first determining location relative to the earth, a detector at said first location, said first location having a first electrical field as determined by the earth's telluric currents, a metallic vehicle movable along a radial line relative to said first location and acting as a movable metallic armature, any said electrical anomaly at a location remote from said first determining location deflecting the telluric current field in and around said anomaly, said first location being comparatively stationary relative to the earth compared to said movable vehicle and said electrical anomaly being comparatively stationary relative to the earth compared to said movable vehicle, whereby passage of said movable metallic vehicle in a horizontal plane near any said electrical anomaly disturbs said first electrical field at said first location to produce a transient electrical field determinable on said detector at said first location.

10. Locating apparatus to locate a magnetic anomaly, comprising, in combination, a first determining location relative to the earth, a detector at said first location, said first location having a first magnetic field as determined by the earth's magnetic field, a magnetically permeable vehicle movable along a radial line relative to said first location and acting as a movable metallic armature, any said magnetic anomaly at a location remote from said first determining location deflecting the earth's magnetic field in and around said anomaly, said first location being comparatively stationary relative to the earth compared to said movable vehicle and said magnetic anomaly being comparatively stationary relative to the earth compared to said movable vehicle, whereby passage of said movable vehicle in a horizontal plane near any said magnetic anomaly disturbs said first magnetic field at said first location to produce a transient magnetic field determinable on said detector at said first location.

11. Apparatus for determining the presence and location of bodies which are one of magnetically and electrically anomalous, comprising, in combination, a first determining location having a zone of detection therearound, said first location having a first field as established by one of telluric currents and magnetic lines of forces of the earth, measuring means at said first location determining the instantaneous value of a characteristic of said first field, a movable metallic vehicle movable relative to said first location, presence of one of a magnetic and electric anomaly within said zone of detection causing said first field to be disturbed with increased field intensity at said anomaly, and passage of said movable vehicle to a position adjacent any said anomaly causing co-action between the movement of said metallic vehicle and said disturbed first field to establish a transient change in said first field at said first location to thereby indicate on said measuring means the presence of said anomaly.

12. Apparatus for determining the presence and location of bodies which are one of magnetically and electrically anomalous, comprising, in combination, a first determining location having a first field as established by one of telluric currents and magnetic lines of force of the earth, measuring means at said first location determining the instantaneous value of a characteristic of said first field, a moving metallic vehicle movable in a generally horizontal radial line relative to said first location, movement of said movable metallic vehicle in space causing a variation of the direction of the individual lnes constituting said first field near the instantaneous position of said movable vehicle, presence of one of a magnetic and electric anomaly below the surface of the earth within a zone of detection having said first location as the center thereof causing said first field to be disturbed from the nominal generally parallel line pattern into converging and diverging field lines with increased field intensity at said anomaly, and passage of said movable vehicle to a position vertically above any said anomaly under the surface of the earth causing co-action between said variation in said first field and said disturbed first field to establish a relatively rapid change in said first field at said first location to thereby indicate on said measuring means the presence of said anomaly vertically below said movable vehicle at that instant.

13. Apparatus for determining the location and presence of magnetically anomalous bodies comprising, in combination, measuring means positioned at a first location determining the instantaneous value of one of amplitude and direction of the magnetic field of the earth, a magnetically permeable vehicle movable in a generally horizontal radial line relative to said first location, movement of said movable vehicle in space causing a variation of the direction of the individual lines constituting said magnetic field near the instantaneous position of said movable vehicle, presence of a magnetic anomaly below the surface of the earth within a zone of detection having said first location as the center thereof causing said magnetic field to be disturbed from the nominal generally parallel line pattern into converging and diverging field lines with increased field intensity at said anomaly, and passage of said movable vehicle to a position vertically above any said magnetic anomaly under the surface of the earth causing co-action between said variation in said magnetic field and said disturbed field to establish a relatively rapidly changing magnetic field at said first location to thereby indicate on said measuring means the presence of said anomaly vertically below said movable vehicle at that instant.

14. Apparatus for determining the location and presence of electrically anomalous bodies comprising, in combination, measuring means positioned at a first location determining the instantaneous potential difference on first and second conductor means as determined by the telluric current field of the earth, a metallic vehicle movable in a generally horizontal plane along a radial line relative to said first location, movement of said movable metallic vehicle in space causing a variation of the direction of the telluric currents in the surface of the earth near the instantaneous position of said movable vehicle, presence of an electrical anomaly below the surface of the earth within a zone of detection having said first location as the center thereof causing the telluric current field to be disturbed from the nominal generally parallel line pattern into converging and diverging field lines with increased field intensity at said anomaly, and passage of said movable vehicle to a position vertically above any said electrical anomaly under the surface of the earth causing co-action between said variation in telluric current field direction and said disturbed telluric current field to establish a relatively rapidly changing electrical field at said first location to thereby indicate on said measuring means the presence of said anomaly vertically below said movable vehicle at that instant.

15. In a method for determining the presence and location of bodies which are one of magnetically and electrically anomalous with the aid of a movable metallic vehicle, said method comprising the steps of, establishing a first determining location on the earth, one of the magnetic lines of force of the earth and the telluric currents of the earth establishing a first field at said first location, said first location being within a zone of detection, moving said movable metallic vehicle through said zone of detection, the presence of an anomalous body which is one of magnetically and electrically anomalous establishing a disturbed first field, establishing a transient change in said disturbed first field by passage of said movable vehicle to a position vertically adjacent any said anomalous body, and measuring said transient change at said first location to thereby indicate the presence of any said anomalous body vertically adjacent said movable vehicle at that instant.

16. In a method for determining the presence and location of bodies which are one of magnetically and electrically anomalous with the determination being made by a field measuring device at a first location and through the agency of a movable metallic vehicle, said method comprising the steps of, establishing a first determining location on the earth, the magnetic lines of force of the earth and the telluric currents of the earth establishing one of a magnetic and electrical first field at said first location, said first location being at the center of a zone of detection, moving said movable metallic vehicle along a radial line from said first location in a generally horizontal plane through said zone of detection, and the passage of said movable vehicle to a position adjacent an anomalous body which is one of magnetically and electrically anomalous causing co-action between said movable vehicle and the disturbance of said first field caused by the presence of said anomalous body to establish a relatively rapid transient change in said first field observable on a field measuring device at said first location to thereby indicate the presence of any said anomalous body adjacent said movable vehicle at that instant.

17. In a method for determining the presence and location of electrical anomalies with the determination being made by an electrical field responsive device at a first location and through the agency of a movable metallic vehicle, said method comprising the steps of, establishing a first determining location on the earth, the telluric currents of the earth establishing an electrical first field at said first location, said first location being at the center of a zone of detection, moving said movable metallic vehicle along a radial line from said first location in a generally horizontal plane through said zone of detection, and the passage of said movable vehicle to a position vertically above an electrical anomaly causing coaction between said movable vehicle and the disturbance of said first electrical field caused by the presence of said anomaly to establish a relatively rapid transient change in said first electrical field observable on a field responsive device at said first location to thereby indicate the presence of any said anomaly vertically below said movable vehicle at that instant.

18. In a method for determining the presence and location of magnetic anomalies with the determination being made by a magnetic field measuring device at a first location and through the agency of a movable magnetically permeable vehicle, said method comprising the steps of, establishing a first determining location on the earth, the magnetic lines of force of the earth establishing a magnetic first field at said first location, said first location being at the center of a zone of detection, moving said movable magnetically permeable vehicle along a radial line from said first location in a generally horizontal plane through said zone of detection, and the passage of said movable vehicle to a position vertically above a magnetic anomaly causing co-action between said movable vehicle and the disturbance of said first magnetic field caused by the presence of said anomaly to establish a relatively rapid transient change in said first magnetic field observable on a field measuring device at said first location to thereby indicate the presence of any said anomaly vertically below said movable vehicle at that instant.

References Cited

UNITED STATES PATENTS

| | | | |
|---|---|---|---|
| 2,238,072 | 4/1941 | Nelson et al. | 324—8 |
| 2,479,808 | 8/1949 | Beth | 324—70 |
| 2,902,636 | 9/1959 | Coker et al. | 324—8 |
| 3,160,879 | 12/1964 | Downing et al. | |

WALTER L. CARLSON, *Primary Examiner.*

G. R. STRECKER, *Assistant Examiner.*